Jan. 9, 1951　　　D. T. JAMES　　　2,537,672
OVERLOAD RELEASE MECHANISM
Filed Dec. 31, 1948
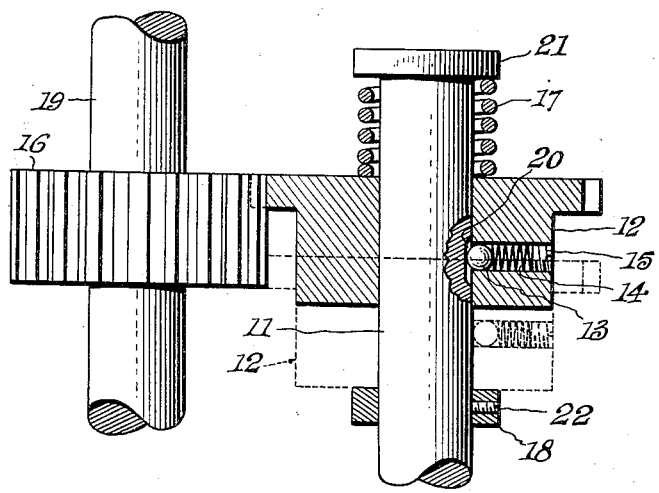
Inventor
DAVID T. JAMES
By Elmer H. Gates
ATTORNEY Patented Jan. 9, 1951

2,537,672

UNITED STATES PATENT OFFICE 2,537,672

OVERLOAD RELEASE MECHANISM

David T. James, Middletown, Md.

Application December 31, 1948, Serial No. 68,706

4 Claims. (Cl. 74—411)

(Granted under the act of March 3, 1883, as amended April 30, 1928; 370 O. G. 757)

The invention described herein may be manufactured and used by or for the Government, for governmental purposes, without the payment to me of any royalty thereon.

This invention relates to torque responsive overload release mechanisms.

In power transmission there is frequent danger of overload with consequent damage to transmission equipment. To avoid this danger, clutch and gear transmission units are generally equipped with means operated by the overload to disassociate the driven member from the driving member. One means used is an arrangement of shear pins designed to break at a predetermined torque overload. Although such pins are inexpensive, when such a break occurs it is necessary to shut off power, disassemble the transmission unit, remove the sheared pin, insert a fresh pin, and reassemble the unit, causing loss of time, labor and production.

Various prior improvements have been suggested to overcome this disadvantage. Generally a steel ball is proposed in place of the shear pin. The ball usually is arranged to be forced by a retaining spring into a groove similar to a keyway, where it acts to engage the driven member with the driving member and to carry the normal load. When an overload occurs the ball is forced out of the groove back into its recess against the action of its retaining spring, and the driven member runs free of the overload driving unit. When the overload is removed, the action of the retaining spring forces the ball back into its normal groove engaging position and power is again transmitted from the driving member to the driven member. However, this automatic reengagement frequently causes a damaging chattering action and a harmful repetitive application of power to the system in which such a release is used.

An important object of the present invention is to overcome these disadvantages by providing an improved overload release device that embodies novel resetting means that operates positively and independently of the removal of the overload. Other equally important objects will appear more plainly from the detailed specification and drawings herein presented in exemplification but not in limitation of the present invention. Like reference characters represent like parts in the drawings, which illustrate a preferred embodiment of the present invention and diagrammatically show in:

Figure 1, a front elevation, partly in cross section, of a driven member and a driving member embodying the present invention.

In Figure 1, driving gear 12 is mounted on driving shaft 11 by means of the engagement of the walls of shaft groove 20 with the ball 13. A recess 23 is provided in driving gear 12 for housing the ball 13, which is held in recess 23 by plug 15 and by the ball retaining spring 14, which normally is arranged to urge ball 13 into groove 20 in shaft 11.

Driving gear 12 is positioned on shaft 11 by means of gear spring 17 and a retaining collar 21. Spring 17 is arranged so that it will have sufficient force to move gear 20 downwardly on shaft 11 only when ball 13 is out of engagement with groove 20. The lower portion of driving shaft 11 is provided with a stop collar 18 held in position by set screw 22. Collar 18 is positioned on shaft 11 at a distance from gear 12 that is greater than the length of groove 20 but close enough to gear 12 to permit gear 12 to remain in mesh with driven gear 16 even when gear 12 is in its lower position in contact with collar 18. Driven gear 16 may be mounted in the usual manner on a driven shaft 19, as shown in Figure 1.

In operation, when an overload occurs the force of retaining spring 14 is overcome. This causes ball 13 to be forced backward into recess 23 and out of engagement with groove 20. This permits shaft 11 to rotate freely inside of gear 12, and then gear 12 and gear 16 accordingly do not rotate. After ball 13 is thus disengaged from groove 20, spring 17 acts to slide gear 12 downwardly on shaft 11 until it comes in contact with stop collar 18, where it is held in that position by the spring 17. This causes the groove 20 to be in a position that is out of register with the recess 23 and accordingly makes it impossible for ball 13 to automatically reengage groove 20 when the overload is removed.

In order to reengage ball 13 with groove 20 it is necessary to force gear 12 upwardly along shaft 11 by manual, mechanical, or other means, against the action of spring 17, until groove 20 is again in register with recess 23, ball 13 again engages groove 20, and shaft 11 again rotates gear 12, which in turn rotates driven gear 16.

In certain types of equipment where the shaft 11 may be mounted in a substantially vertical position it may not be necessary to provide the spring 17, as gear 12, in such an instance, may be made heavy enough so that the pressure of spring 23 may be overcome by the downward pull of gravity on gear 12. This pull of gravity will also hold gear 12 by its weight alone against stop collar 18 until gear 12 is pushed upwardly, by hand or by other means, on the shaft 11 until ball 13 and groove 20 are again in engagement.

This device has proven of great value in mechanisms performing accurate and delicate operations, such as the Automatic Inoculating Apparatus, shown in copending application Serial Number 65,542, filed December 16, 1948; used in conjunction with Positive Displacement Pump, shown in copending application Serial Number 68,708, filed December 31, 1948; and Revolution Control Mechanism, shown in copending application Serial Number 68,707, filed December 31, 1948.

While a preferred example of the present invention has been described in detail, it is not limited thereto, but is intended to include all of its modifications and embodiments within the spirit and scope of the appended claims.

I claim:

1. In combination, in a torque responsive overload release mechanism: a driven shaft; a driven gear provided with driven gear teeth mounted thereon; a drive shaft; a drive gear having drive gear teeth and slidably mounted for reciprocating longitudinal movement along said drive shaft while in mesh with said driven gear; stop means on said drive shaft for limiting said movement; spring-pressed ball means in said gear and ball socket means in said drive shaft for maintaining below a predetermined torque engagement between said drive gear and said drive shaft and arranged to cause a release of said engagement upon the application to said drive shaft of a predetermined minimum overload; and a spring coil encircling said drive shaft and pressing against said drive gear and an abutment on said drive shaft to prevent reengagement of said drive shaft with said drive gear upon the removal of said overload.

2. In combination, in a torque responsive overload release mechanism; a driven shaft provided with a driven gear having gear teeth, a drive shaft, a drive gear slidably mounted on said drive shaft having drive gear teeth shorter than said driven gear teeth in mesh with said driven gear and slidably mounted for reciprocating longitudinal movement along said drive shaft; stop means on said drive shaft for limiting said movement; spring-pressed ball means in said drive gear and socket means in said drive shaft for maintaining at loads below a predetermined minimum torque overload engagement between said drive gear and said shaft and for causing a release of said engagement upon the application to said drive shaft of a said overload; and a spring coil on said drive shaft to prevent reengagement by said ball means of said drive shaft with said drive gear upon the removal of said overload.

3. In combination, in a torque responsive overload release mechanism; a driven shaft; a driven gear mounted thereon; a drive shaft; a drive gear having drive gear teeth shorter than said driven gear teeth in mesh with said driven gear and slidably mounted for reciprocating longitudinal movement along said drive shaft; stop means on said drive shaft for limiting said movement; spring-pressed balls radially movable in said drive gear and ball socket in said drive shaft to receive said balls and maintain engagement under normal operating loads between said drive gear and said shaft and to cause a release of said engagement upon the application to said drive shaft of a predetermined minimum torque overload; and a spring coil encircling said drive shaft to prevent reengagement of said balls with said ball sockets upon removal of said overload; said driven gear and said drive gear being parallel to and in mesh with each other when said drive shaft and said drive gear are released by said balls from engagement with each other.

4. In combination, in a torque responsive overload release mechanism; a driven shaft provided with a driven gear having gear teeth, a drive shaft, a drive gear slidably mounted on said drive shaft for reciprocating movement on said drive shaft having drive gear teeth shorter than said driven gear teeth in mesh with said driven gear on said drive shaft, stop means on said drive shaft for limiting said movement; spring-pressed ball means in said drive gear and socket means in said drive shaft for maintaining, at loads below a predetermined minimum torque overload, engagement with said drive gear and said shaft and for releasing said engagement upon the application of said drive shaft of said overload; and a spring compression coil on said drive shaft to move the drive gear longitudinally on the drive shaft and thereby prevent automatic reengagement by said ball means with said drive shaft and with said drive gear.

DAVID T. JAMES.

REFERENCES CITED

The following references are of record in the file of this patent:

UNITED STATES PATENTS

| Number | Name | Date |
|---|---|---|
| 792,543 | McNeill | June 13, 1905 |
| 949,179 | Gilbert | Feb. 15, 1910 |
| 1,502,358 | Stokes | July 22, 1924 |
| 1,517,285 | Fischedick et al | Dec. 2, 1924 |
| 2,401,992 | Waller | June 11, 1946 |
| 2,412,630 | Nelson | Dec. 17, 1946 |

FOREIGN PATENTS

| Number | Country | Date |
|---|---|---|
| 554,046 | Germany | Oct. 27, 1929 |